United States Patent
Wu et al.

(10) Patent No.: US 10,901,436 B2
(45) Date of Patent: Jan. 26, 2021

(54) METHOD AND SYSTEM FOR CONTROLLING A MOVABLE OBJECT USING MACHINE-READABLE CODE

(71) Applicant: SZ DJI TECHNOLOGY CO., LTD., Shenzhen (CN)

(72) Inventors: Yuwei Wu, Shenzhen (CN); Jun Wu, Shenzhen (CN); Ming Gong, Shenzhen (CN); Mingxi Wang, Shenzhen (CN); Qi Zhou, Shenzhen (CN); Di Wu, Shenzhen (CN); Xiangyu Chen, Shenzhen (CN); Hanping Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 65 days.

(21) Appl. No.: 16/241,103

(22) Filed: Jan. 7, 2019

(65) Prior Publication Data
US 2019/0138030 A1 May 9, 2019

Related U.S. Application Data

(63) Continuation of application No. PCT/CN2016/089220, filed on Jul. 7, 2016.

(51) Int. Cl.
*G05D 1/10* (2006.01)
*G05D 1/00* (2006.01)
(Continued)

(52) U.S. Cl.
CPC ........... *G05D 1/101* (2013.01); *B64C 39/024* (2013.01); *G05D 1/0038* (2013.01);
(Continued)

(58) Field of Classification Search
CPC .. G05D 1/1001; G05D 1/0038; G05D 1/0808; B64C 39/024; B64C 2201/127; B64C 2201/141; G06K 19/06037
See application file for complete search history.

(56) References Cited

U.S. PATENT DOCUMENTS

| | | | |
|---|---|---|---|
| 2017/0091710 A1* | 3/2017 | Van Dyke | H04L 67/42 |
| 2017/0134699 A1* | 5/2017 | Kim | B64C 39/024 |

(Continued)

FOREIGN PATENT DOCUMENTS

| | | |
|---|---|---|
| CN | 103226356 A | 7/2013 |
| CN | 103809598 A | 5/2014 |

(Continued)

OTHER PUBLICATIONS

The World Intellectual Property Organization (WIPO) International Search Report and Written Opinion for PCT/CN2016/089220 dated Apr. 10, 2017 8 Pages.

*Primary Examiner* — Hunter B Lonsberry
*Assistant Examiner* — Elizabeth Yang
(74) *Attorney, Agent, or Firm* — Anova Law Group, PLLC

(57) ABSTRACT

The present disclosure describes systems and methods for operating a movable object using a machine readable code. In one embodiment, an image may be obtained by the movable object. The image may include a machine-readable code configured to store a set of operation data for controlling the movable object. The movable object may process the image to retrieve the machine-readable code and the set of operation data. The movable object further may adjust one or more operation parameters of the movable object based on the set of operation data.

19 Claims, 13 Drawing Sheets

(51) Int. Cl.
  *B64C 39/02* (2006.01)
  *G05D 1/08* (2006.01)
  *G06K 19/06* (2006.01)

(52) U.S. Cl.
  CPC ..... *G05D 1/0808* (2013.01); *G06K 19/06037* (2013.01); *B64C 2201/127* (2013.01); *B64C 2201/141* (2013.01)

(56) References Cited

U.S. PATENT DOCUMENTS

| | | | |
|---|---|---|---|
| 2017/0248969 A1* | 8/2017 | Ham | G08G 5/0021 |
| 2017/0262789 A1* | 9/2017 | Zhang | G06Q 10/08 |
| 2017/0351900 A1* | 12/2017 | Lee | G06K 9/00228 |
| 2018/0039282 A1* | 2/2018 | Gupta | G05D 1/0291 |
| 2018/0046180 A1* | 2/2018 | Falk | G08C 17/02 |
| 2019/0050789 A1* | 2/2019 | Ko | B64C 39/024 |
| 2019/0138867 A1* | 5/2019 | Vander Aa | G06K 19/06056 |

FOREIGN PATENT DOCUMENTS

| | | |
|---|---|---|
| CN | 105335733 A | 2/2016 |
| CN | 105388908 A | 3/2016 |
| WO | 2016065623 A1 | 5/2016 |

\* cited by examiner

METHOD AND SYSTEM FOR CONTROLLING A MOVABLE OBJECT USING MACHINE-READABLE CODE

CROSS-REFERENCE TO RELATED APPLICATION

This application is a continuation of International Application No. PCT/CN2016/089220, filed on Jul. 7, 2016, the entire contents of which are incorporated herein by reference.

TECHNICAL FIELD

The disclosed embodiments relate generally to controlling a movable object and more particularly, but not exclusively, to control a movable object using machine-readable code.

BACKGROUND

Movable objects such as unmanned aerial vehicles (UAVs) can be used for performing surveillance, reconnaissance, and exploration tasks for military and civilian applications. A movable object may carry a payload configured to perform a specific function, such as capturing images of the surrounding environment or tracking a specific target. Movement control information for controlling a movable object is typically received by the movable object from a remote device. Edit and/or transmission of movement control information from the remote device to the movable object are important to the operation of the movable object.

SUMMARY

There is a need for systems and methods for operating a movable object using a fast and simple way of editing and transmitting movement control information (e.g., operation data) between a movable object and a control unit. Such systems and methods optionally complement or replace conventional methods for controlling a movable object. By encoding the movement control information in a machine readable code, and by making the machine readable code available to a movable object for operating the movable object, some embodiments of the present application can significantly improve the efficiency and convenience of managing the movement control information. Additionally, the movement control information can be easily shared among different users and/or different movable objects.

In accordance with some embodiments, a method for operating a movable object using a machine readable code comprises: obtaining an image by the movable object. The image includes a machine-readable code configured to store a set of operation data for controlling the movable object. The method further comprises processing, by the movable object, the image to retrieve the machine-readable code and the set of operation data. The movable object further adjusts one or more operation parameters of the movable object based on the set of operation data.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise an imaging device; one or more processors coupled to the imaging device; memory; and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

In accordance with some embodiments, a method for controlling a movable object using a machine readable code comprises: obtaining an image by a computing device in communication with the movable object. The image includes a machine-readable code configured to store a set of operation data for controlling the movable object. The method further comprises processing, by the computing device, the image to retrieve data for controlling the movable object. The computing device further sends the data for controlling the movable object to the movable object for adjusting one or more operation parameters of the movable object.

In accordance with some embodiments, a computing device may comprise one or more processors, memory, and one or more programs. The computing device is in communication with a movable object and is configured to control the movable object. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

In accordance with some embodiments, a method for controlling a movable object using a machine readable code comprises: receiving a set of operation data including one or more data items for controlling a movable object; generating a machine-readable code based on the one or more data items of the set of operation data; and making the machine-readable code available to the movable object for adjusting one or more operation parameters of the movable object.

In accordance with some embodiments, a system may comprise one or more processors, memory, and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the movable object, cause the movable object to perform the operations of the above method.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

Embodiments consistent with the present disclosure provide techniques related to controlling UAVs using operation data (e.g., including navigation data and/or operation parameters) stored in a machine-readable code (e.g., a two-dimensional quick response (QR) code). The machine-readable code can be captured by an imaging sensor borne by the UAV. The machine-readable code can be processed by the UAV or a control unit in communication with the UAV to obtain the operation data. Using a machine-readable code can provide convenience and efficiency for storing, editing, and/or updating operation data for controlling a UAV.

Figure 1:
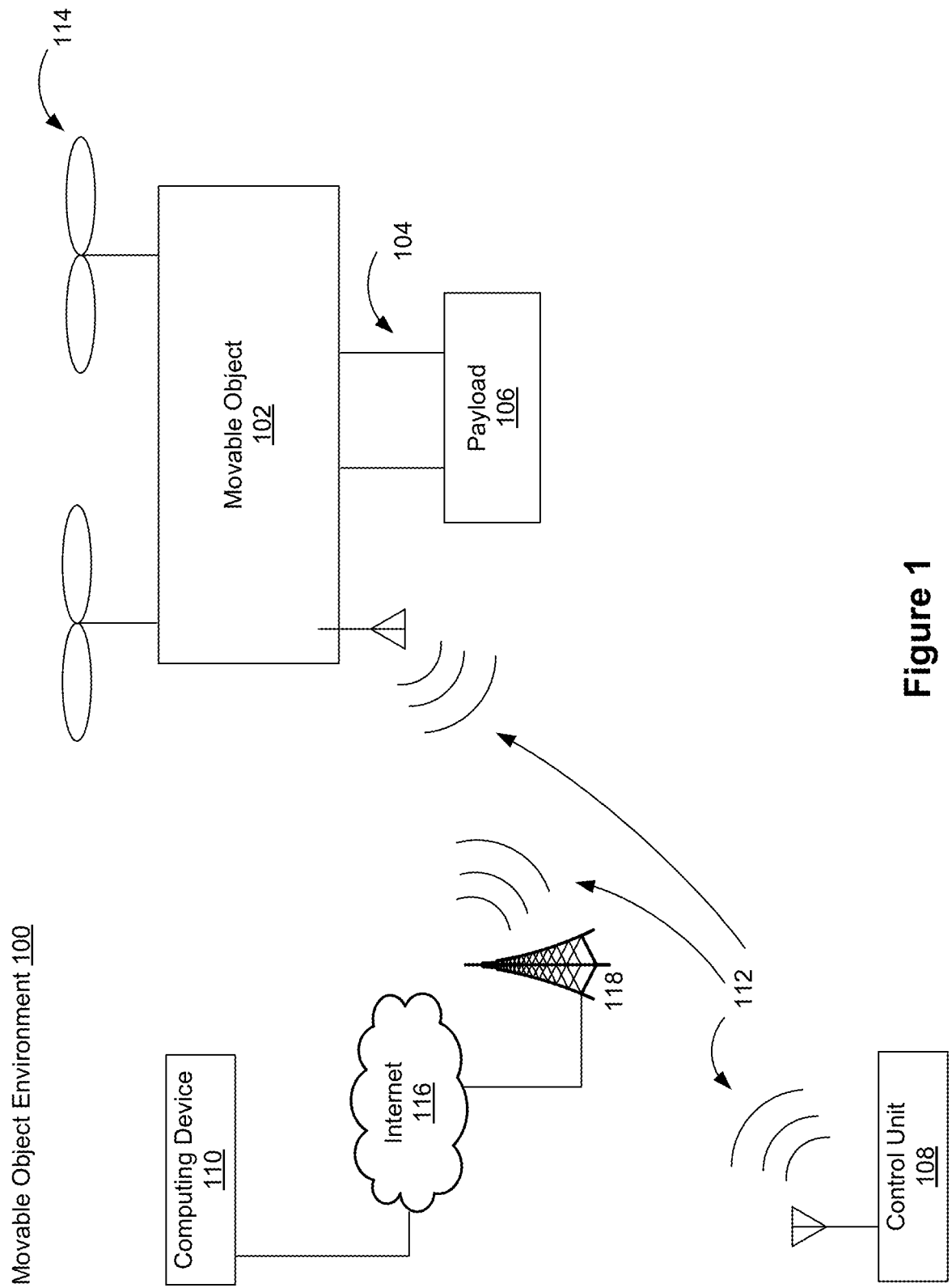
FIG. 1 illustrates a movable object environment, in accordance with some embodiments.

FIG. 1 illustrates a movable object environment 100, in accordance with some embodiments. The movable object environment 100 includes a movable object 102. In some embodiments, the movable object 102 includes a carrier 104 and/or a payload 106.

In some embodiments, the carrier 104 is used to couple the payload 106 to the movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via carrier 104) such that the payload 106 remains substantially stationary relative to movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, a control unit 108 communicates with the movable object 102, e.g., to provide control instructions to the movable object 102 and/or to display information received from the movable object 102. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., orientation, position, orientation, velocity, acceleration, navigation, and/or tracking. For example, a position of an input device of the control unit 108 (e.g., a position of a component of the input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of control unit 108 is used to input a flight mode for the movable object 102, such as auto pilot or navigation according to a predetermined navigation path.

In some embodiments, a display of the control unit 108 displays information generated by the movable object sensing system 210, the memory 204, and/or another system of the movable object 102. For example, the display displays information about the movable object 102, the carrier 104, and/or the payload 106, such as position, orientation, orientation, movement characteristics of the movable object 102, and/or distance between the movable object 102 and another object (e.g., a target and/or an obstacle). In some embodiments, information displayed by a display of control unit 108 includes images captured by an imaging device 216 (FIG. 2), tracking data (e.g., a graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the movable object environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, orientation, and/or one or more movement characteristics of the movable object 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the carrier 104 relative to the movable object 102 with up to six degrees of freedom.

In some embodiments, control instructions are used to adjust one or more operational parameters for the payload 106. For example, control instructions include instructions for adjusting an optical parameter (e.g., an optical parameter of the imaging device 216). In some embodiments, control instructions include instructions for adjusting imaging properties and/or image device functions, such as capturing an image, initiating/ceasing video capture, powering an imaging device 216 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 216.

In some embodiments, when control instructions are received by movable object 102, the control instructions change parameters of and/or are stored by memory 204 (FIG. 2) of movable object 102.

Figure 2:
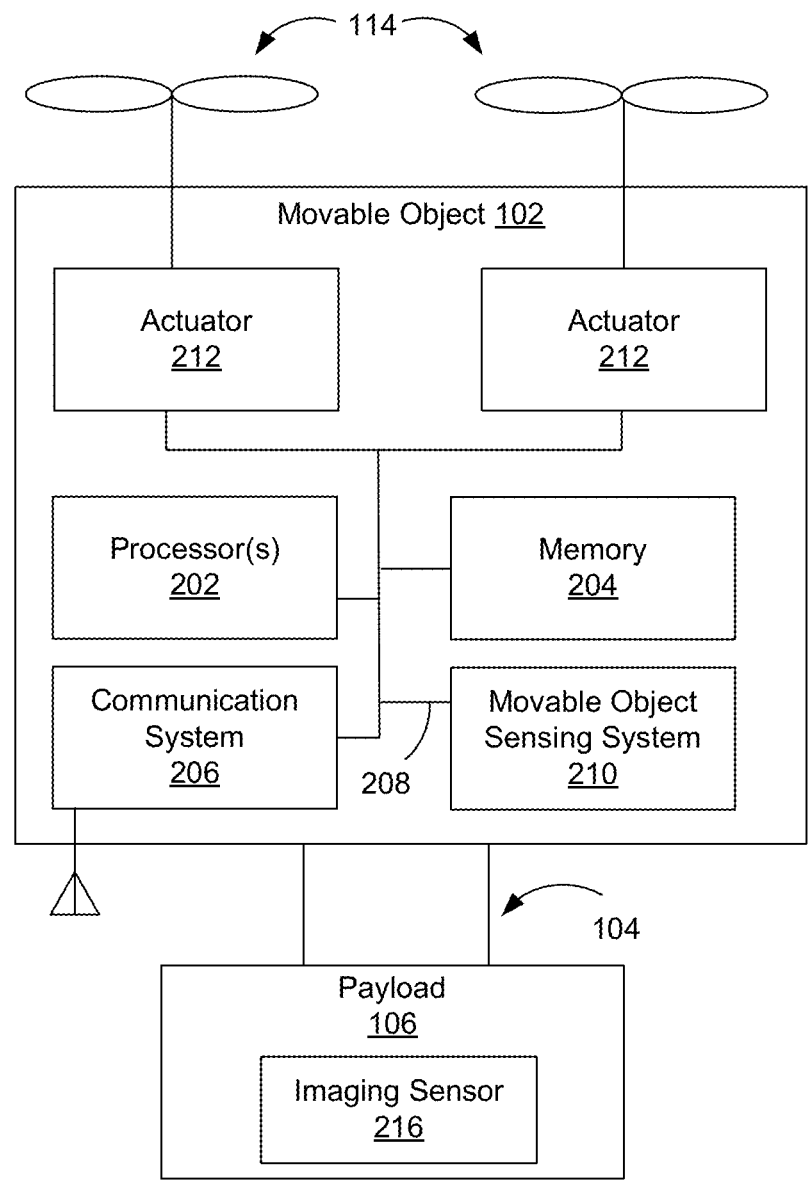
FIG. 2 illustrates a movable object, in accordance with some embodiments.

FIG. 2 illustrates an exemplary movable object 102, in accordance with some embodiments. The movable object 102 typically includes one or more processor(s) 202, a memory 204, a communication system 206, a movable object sensing system 210, and one or more communication buses 208 for interconnecting these components.

In some embodiments, the movable object 102 is a UAV and includes components to enable flight and/or flight control. In some embodiments, the movable object 102 includes communication system 206 with one or more network or other communications interfaces (e.g., via which flight control instructions are received), one or more movement mechanisms 114, and/or one or more movable object actuators 212 (e.g., to cause movement of movement mechanisms 114 in response to received control instructions). Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to the movable object 102 using any suitable means, such as support elements (e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "elements" herein. One or more elements described with regard to the memory 204 are optionally stored by the control unit 108, the computing device 110, and/or another device. In some embodiments, imaging device 216 includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable object 102 is stored as a system setting of the system configuration. In some embodiments, the controlling system configuration includes a configuration for the imaging device 216. The configuration for the imaging device 216 stores parameters such as position, zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., generated by processor(s) 202 and/or received by the movable object 102 from control unit 108 and/or the computing device 110). In some embodiments, parameters stored by the imaging device configuration are updated in response to information received from the movable object sensing system 210 and/or the imaging device 216.

In some embodiments, a controlling system performs imaging device adjustment. The imaging device adjustment module stores, e.g., instructions for adjusting a distance between an image sensor and an optical device of an imaging device 216, e.g., instructions for controlling an imaging device actuator. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable object 102 and/or an image subject (e.g., a target or a remote object) has moved by more than a threshold distance, and/or in response to user input. In some embodiments, user input (e.g., received at control unit 108 and/or computing device 110) initiates and/or adjusts an autofocus mode. In some embodiments, user input indicates one or more regions (e.g., in an image captured by imaging device 216, such as an image displayed by control unit 108 and/or computing device 110) to be used and/or prioritized for an autofocus operation. In some embodiments, the autofocus module generates control instructions for moving an optical device relative to an image sensor in accordance with an image distance value determined by an image distance determination module. In some embodiments, one or more instructions for performing an autofocus operation are stored in the memory 204.

In some embodiments, the controlling system performs image distance determination, e.g., to determine an object distance and/or an image distance in accordance with the operations described herein. For example, the image distance determination module uses sensor data from one or more depth sensors and one or more orientation sensors of a movable object to determine an image distance and generate a control instruction for moving an optical device relative to an image sensor in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable object 102. In some embodiments, one or more of the above identified modules are stored on one or more storage devices of a device remote from the movable object (such as memory of the control unit 108, the computing device 110, and/or the imaging device 216) and/or executed by one or more processors of a device remote from the movable object 102 (such as processor(s) of the control unit 108, the computing device 110, and/or the imaging device 216).

The communication system 206 enables communication with the control unit 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 210 of the movable object 102 includes one or more sensors. In some embodiments, one or more sensors of the movable object sensing system 210 are mounted to the exterior, located within, or otherwise coupled to the movable object 102. In some embodiments, one or more sensors of the movable object sensing system 210 are components of and/or coupled to the carrier 104, the payload 106, and/or the imaging device 216. Where sensing operations are described herein as being performed by the movable object sensing system 210, it will be recognized that such operations are optionally performed by one or more sensors of the carrier 104, the payload 106, and/or the imaging device 216 in addition to and/or in lieu of one or more sensors of the movable object sensing system 210.

Figure 3:
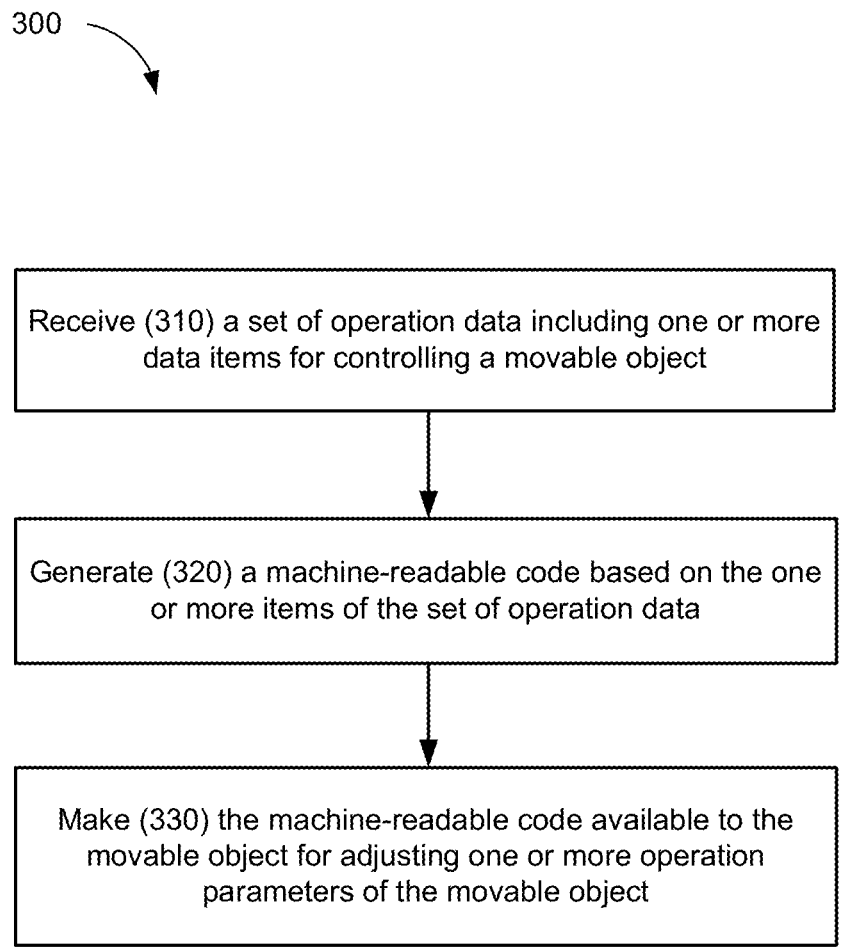
FIG. 3 is a diagram illustrating a method of generating a machine readable code for controlling a movable object, in accordance with some embodiments.

FIG. 3 is a diagram illustrating a method 300 of generating a machine readable code for controlling the movable object 102, in accordance with some embodiments. The method 300 is performed by a device or a system (hereinafter "the system"). The system includes one or more devices, such as the computing device 110, the control unit 108, or the movable object 102 (FIG. 1). In some embodiments, the method 300 is performed by other electronic device(s), such as a mobile device paired with the control unit 108 for operating the movable object 102. Operations performed in FIG. 3 correspond to instructions stored in computer memories or other computer-readable storage mediums of the device or the system.

In some embodiments, the system receives (310) a set of operation data for controlling the movable object 102. The set of operation data includes one or more data items (also referred as "data fields"). In some embodiments, the set of operation data comprises navigation data including, but is not limited to, one or more waypoints, one or more points of interest, and/or a destination of the navigation path. The set of operation data may comprise navigation data including a longitude, a latitude, and/or an altitude. In some embodiments, the set of operation data comprises control data for controlling a position of the movable object 102. The control data may include a roll angle, a pitch angle, a yaw angle, a translation parameter, a rotation parameter, a speed, and/or an acceleration. In some embodiments, the set of operation data comprises gimbal control data. The gimbal control data may comprise a gimbal pitch angle, a gimbal roll angle, and/or a gimbal yaw angle. In some embodiments, the set of operation data comprises imaging device parameters (e.g., camera parameters). The camera parameters may comprise a focal length, a zoom parameter, a shutter speed, and/or an exposure time of the imaging device.

Figure 4B:
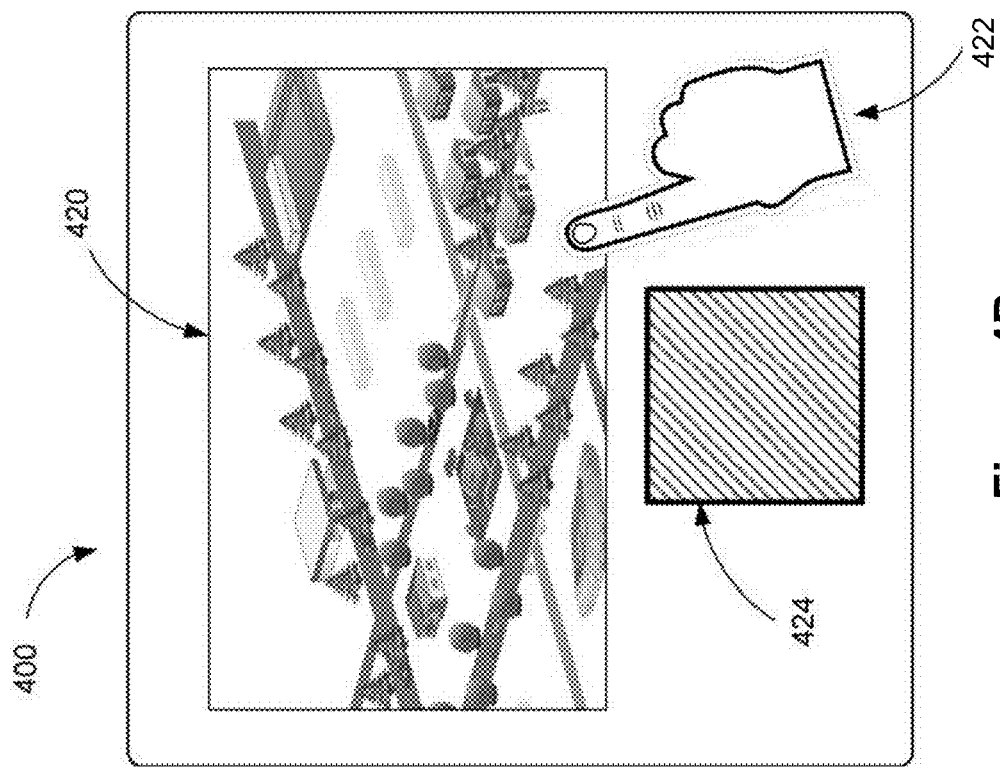
FIGS. 4A-4B illustrate an exemplary user interface for receiving the operation data, in accordance with some embodiments.
Figure 4A:
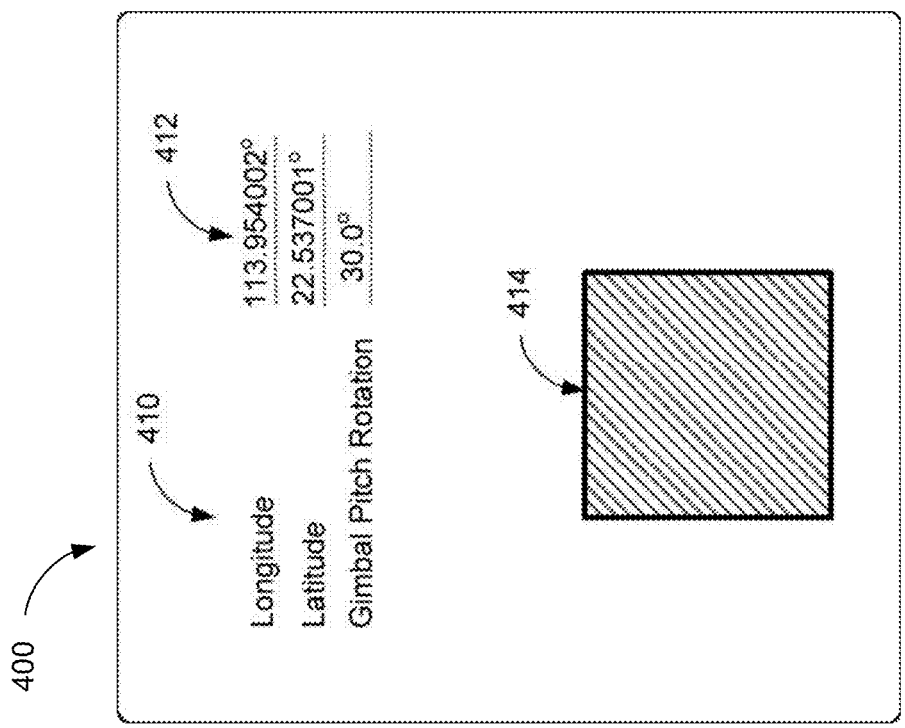

FIGS. 4A-4B are exemplary implementations of user interface 400 for receiving the operation data, in accordance with some embodiments. In some embodiments, the user interface 400 is a display screen or a touch screen display of the computing device 110, the control unit 108, or a mobile device paired with the control unit 108 for controlling the movable object 102.

In some embodiments as shown in FIG. 4A, the system can receive the operation data from a user input on the system. In some embodiments, the operation data includes data for one or more data fields 410 (e.g., a longitude, a latitude, and a gimbal pitch rotation). A user can directly input data 412 (e.g., 113.954002°, 22.537001°, and 30.0°) to fill the one or more data fields 410 (e.g., a longitude, a latitude, and a gimbal pitch rotation) respectively. The user may use an input device, e.g., a soft keyboard or a hard keyboard, to input the operation data on the display of the computing device 110, the control unit 108, or a mobile device paired with the control unit 108. The user input may also include an audio input via a microphone, or a gesture input recognition via a camera of the system to provide the operation data to the system. A QR code 414 (represented as box 414 in FIG. 4A) can be generated based on the operation data 412 from the user input.

In some embodiments as shown in FIG. 4B, the system can receive the operation data from a user interaction 422 with a map application 420 running on the system. The user may indicate a point of interest, a destination, a change to navigation path, a change to a control parameter, a change to a gimbal parameter, and/or a change to an imaging device parameter on the map 420. For example, the user points at, taps, or audio inputs an identifier of a point of interest displayed on the map. The system can obtain the operation data based on the user interaction. A QR code 424 (represented by box 424 in FIG. 4B) can be generated based on the operation data obtained from the user interaction with the map.

Figure 5:
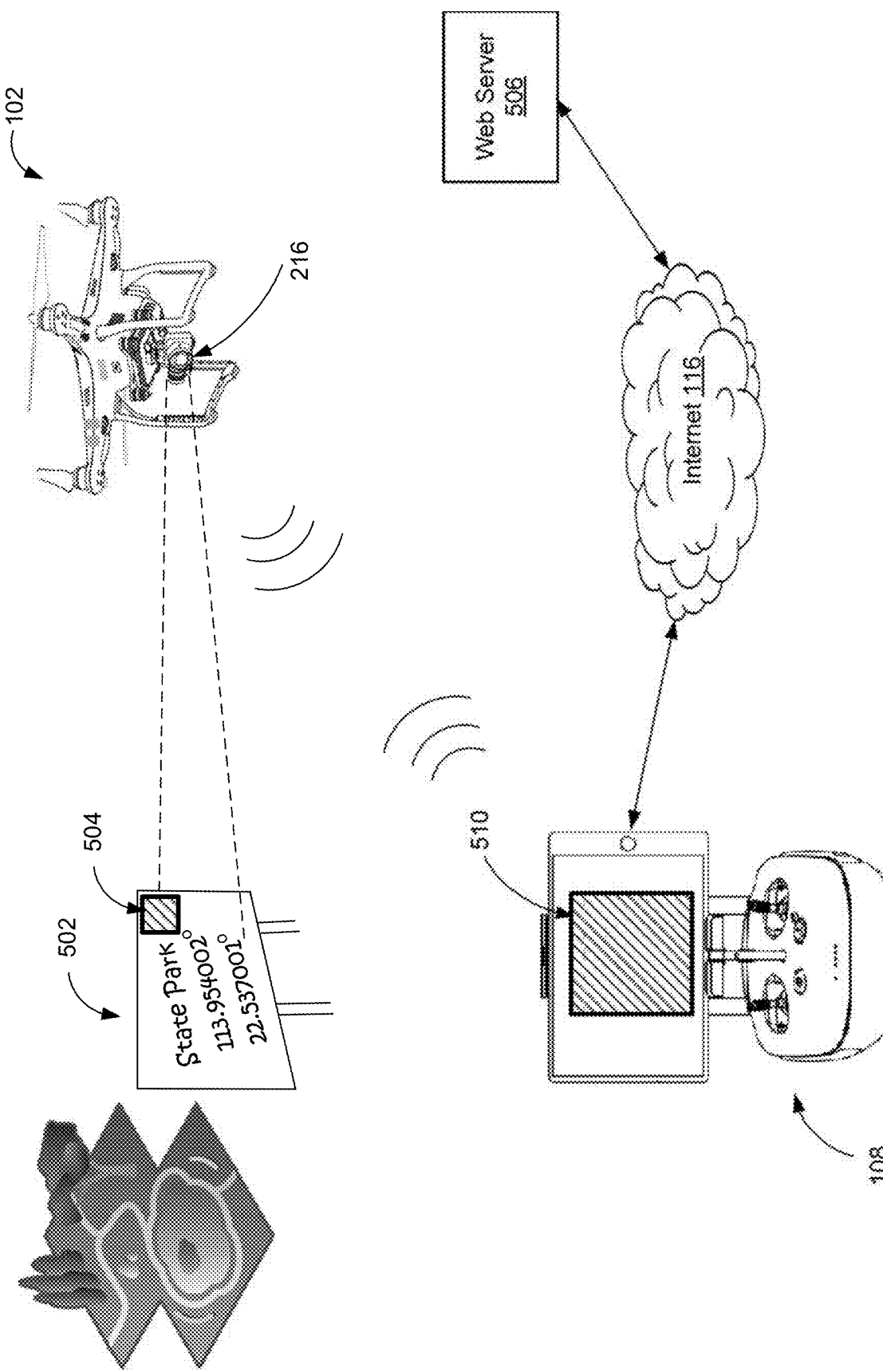
FIG. 5 illustrates an exemplary process of receiving operation data, in accordance with some embodiments.

FIG. 5 is an exemplary implementation illustrating a process of receiving operation data from an operation of the movable object 102, in accordance with some embodiments. In some embodiments, the operation is a manual operation. For example, a user manually controls the movable object 102 using the control unit 108. The operation data can be obtained from the manual operation. For example, the control unit 108 collects data associated with one or more waypoints. In some embodiments, the operation is an auto pilot operation, e.g., the movable object 102 is under autonomous moving control. The control unit 108 can be pre-programmed to record operation data during the auto pilot operation. The operation data can also be obtained from the auto pilot program. The operation data obtained from the operation of the movable object 102 can be used for generating a QR code 510 (represented by box 510 in FIG. 5) as shown on the display of the remote control 108.

In some embodiments, the operation data and/or a carrier of the operation data is captured by the imaging device 216 of the movable object 102. For example, the imaging device 216 captures an image including the operation data. In some embodiments, the image is displayed on a sign 502 (e.g., at a tourist attraction spot), on a billboard (e.g., an advertisement billboard), or is projected by a projector to an object (e.g., the ground). In some embodiments, the image displays the operation data. Alternatively, the operation data is embedded in the image using any suitable format, e.g., in a machine readable code (represented by box 504 in FIG. 5) included in the image.

In some embodiments, the operation data is shared between different user accounts using an application (e.g., a social networking application or a movable object control application) or a message (e.g., an SMS message). For example, the operation data is received from a contact of the user of the system. In some embodiments, the operation data is retrieved from a content provider 506 (e.g., a web server 506) via the Internet 116. In some embodiments, the system generates a URL directed to a downloadable address for retrieving the operation data. The machine readable code may be encoded to store the URL.

In some embodiments, the web server 506 includes a third-party server configured to provide various types of services. Exemplary third-party services including books, business, social networking, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, the web server 506 hosts a website that provides web pages including operation data for controlling movable objects. Alternatively or additionally, the web server 506 hosts an application that is used by computing devices (e.g., remote control 108 or a mobile device paired with remote control 108). In some embodiments, the web server 506 is a single computing device, while in other embodiments, the web server 506 is implemented by multiple computing devices working together to perform the actions of a server system (e.g., cloud computing).

In some embodiments, after receiving the operation data, the system validates the data format. Data for each data item is predetermined to have in a certain format to be recognized by the system. In some examples, the longitude and the latitude are predetermined to be numerical with certain number (e.g., 6) decimal places with units of degrees, the altitude is predetermined to be numerical with certain number (e.g., 2) decimal places with a unit of meters, the gimbal position parameters (e.g., pitch, roll, and/or yaw) are predetermined to integers with units of degrees. One or more way points may be pre-indexed, and the operation data may include an index number representing a certain way point. In some embodiments, the system also validates the range of a respective data item to determine whether the data is valid for controlling the movable object. For example, the longitude data is in a range from −180° and 180°, and the latitude data is in a range from −90° and 90°. The system may auto-correct the format of data in a certain data field. The system may also return an error message when one or more data items are in wrong formats.

Referring back to FIG. 3, in some embodiments, after receiving operation data, the system generates (320) a machine readable code (e.g., QR code 414 in FIG. 4A, or QR code 424 in FIG. 4B). The one or more items of the operation data are encoded in the machine readable code. In some embodiments, the machine readable code is a one-dimensional barcode including a plurality of lines and spaces of various widths. In some embodiments, the machine readable code is a two-dimensional barcode, such as a QR code. A QR code may use standardized encoding modes (e.g., numeric, alphanumeric, byte/binary, and kanji) to efficiently store data.

As shown FIG. 3, in some embodiments, after generating the machine readable code, the system makes (330) the machine readable code available to the movable object 102. In some embodiments, the system displays an image including the machine readable code. In some embodiments, the image including the machine readable code is captured by an imaging device of the system, such as the imaging device 216 of the movable object 102. One or more processors of the system (e.g., the movable object 102) can decode the machine readable code to retrieve the one or more data items of the operation data.

In some embodiments, the image including the machine readable code is projected by a projector onto an object, e.g., the ground, and the movable object 102 can capture the projected image using the imaging device 216. The movable object 102 can process the image and retrieve the operation data from the machine readable code. In some embodiments, the image including the machine readable code can be displayed on or projected onto a sign or a billboard for capturing by the movable object.

In some embodiments, data use for operating the movable object 102 has a predetermined standard format. In some embodiments, the format is "waypoint-index longitude latitude gimbal-frame gimbal-roll gimbal-pitch gimbal-yaw velocity crc=value". The data items are separated using a space between two adjacent data items. For example, a set of data "1 113.954002 22.537001 5.00 b 30.0 0.0 0.0 1 3.0 crc=fa09" includes information of (in sequence): waypoint No. 1 (i.e., indexed 1), a longitude of 113.954002°, a latitude of 22.537001°, an altitude of 5.00 meters, using the movable object body as the reference system for the gimbal, a gimbal roll rotation of 30.0°, a gimbal pitch rotation of 0.0°, a gimbal yaw rotation of 0.0°, imaging device state "on" (i.e., indicated by state code "1"), maximum velocity until the next waypoint being 3.0 meters/second, and an error-detecting code (e.g., a cyclic redundancy check (CRC) or a checksum) including a verification code of 0xfa09. The data decoded from the QR code may be formatted in accordance with the standard format to be recognized by the movable object 102 for adjusting the operation parameters of the movable object 012. The movable object adjusts one or more operation parameters based on the operation data decoded from the machine readable code.

In some embodiments, the system receives an update to a data item of the operation data. The system can modify the operation data to incorporate the update to the data item and generate another machine readable code encoded with the updated data. The system can alternatively modify the machine readable code to reflect the update to the operation data. The system further makes the updated machine readable code available to the movable object 102 for adjusting the operation parameters accordingly.

Figure 6:
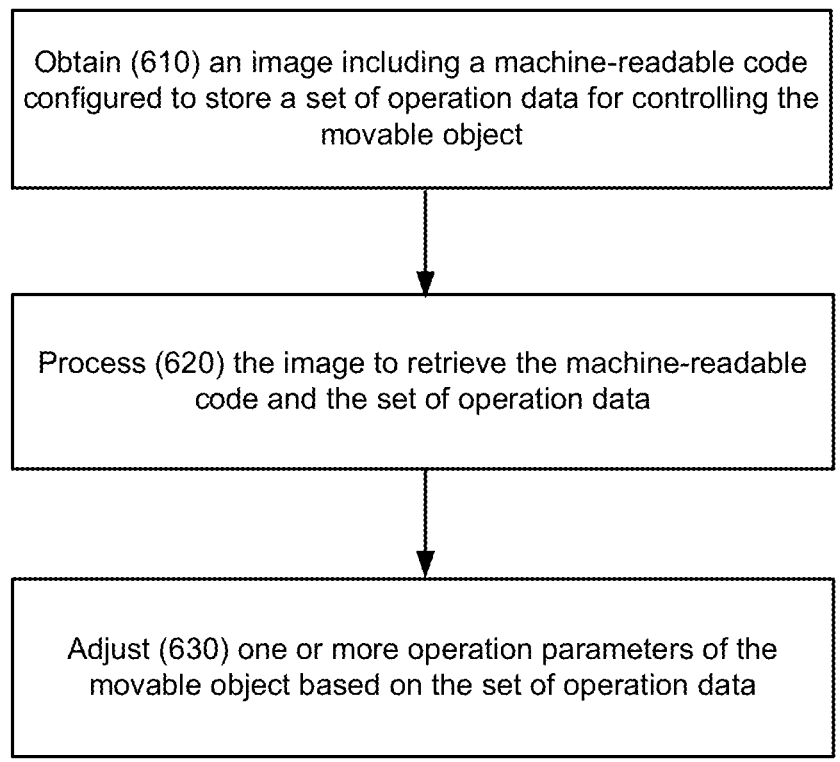
FIG. 6 is a diagram illustrating a method for controlling a movable object, in accordance with some embodiments.

FIG. 6 is a diagram illustrating a method 600 for controlling the movable object 102, in accordance with some embodiments. The method 600 is performed by the movable object 102 (FIGS. 1-2). In some embodiments, the method 600 is performed by other electronic device(s), such as the control unit 108 (FIG. 1), the computing device 110 (FIG. 1), or a mobile device paired with the control unit 108 for operating the movable object 102. Operations performed in FIG. 6 correspond to instructions stored in computer memories or other computer-readable storage mediums of the device or the system.

In some embodiments, the movable object 102 obtains (610) an image including a machine readable code. The machine readable code is encoded to store a set of operation data for controlling the movable object 102. The operation data includes navigation data, position control data, gimbal control data, and/or imaging device parameters as discussed earlier with reference to FIG. 3. In some embodiments, the movable object 102 captures the image using the imaging device 216. In some embodiments, the movable object 102 processes (620) the image to retrieve the machine readable code. In some embodiments, one or more processors of the movable object 102 execute instructions to decode the machine readable code to retrieve the set of operation data. In some embodiments, the movable object 102 adjusts (630) one or more operation parameters (e.g., control parameters) of the movable object 102 based on the set of operation data.

Figure 7:
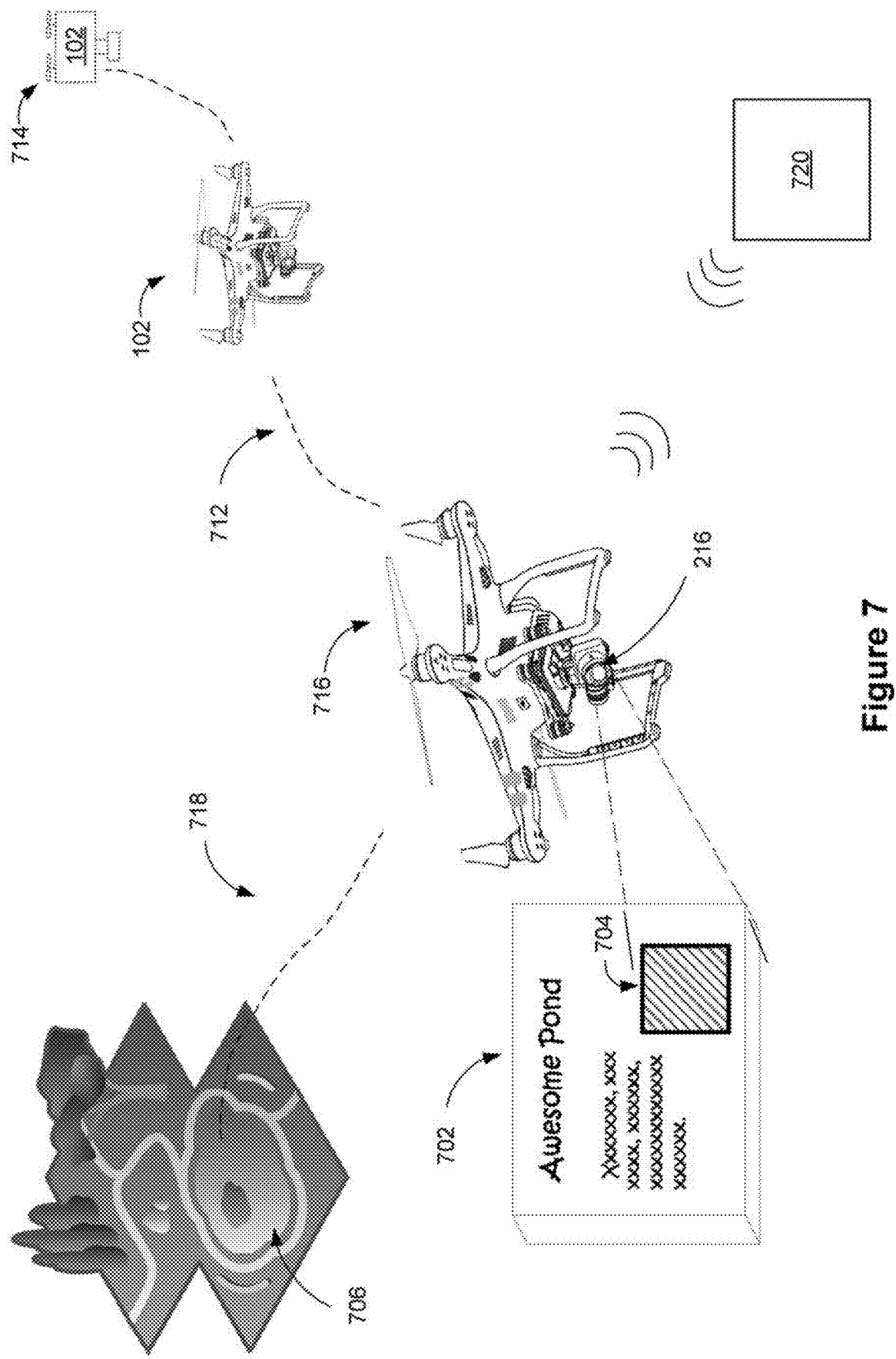
FIG. 7 illustrates an exemplary process of controlling a movable object using a machine readable code, in accordance with some embodiments.

FIG. 7 illustrates an exemplary process of controlling the movable object 102 using a machine readable code, in accordance with some embodiments. In some embodiments, an image 702 including a machine readable code 704 (represented by box 704 in FIG. 7) is displayed on an object. In some embodiments, the image 702 is displayed on an advertisement billboard, a tourist attraction sign, or on a display screen of an electronic device (e.g., a mobile phone or a tablet). In some embodiments, the image 702 is projected by an electronic device, such as a projector, onto an object. For example, the image 702 is projected onto a billboard or to the ground. In some embodiments, the projector includes a light source that shines visible light, infrared (IR) light, or ultraviolet (UV) light. The imaging device 216 borne by the movable object 102 is capable of detecting the corresponding light emitted by the illumination source of the projector. In some embodiments, the image 702 and/or the machine readable code is shared from a first user to a second user on an electronic device.

As shown in FIG. 7, the movable object 102 flies along a path 712 from a first location 714 to a second location 716. In some embodiments, a first set (e.g., an initial set) of operation data for controlling the movable object 102 is generated based on a manual operation or an auto pilot operation of the movable object 102 at the first location 714. The operation data includes navigation data, position control data, gimbal control data, and/or imaging device parameters as discussed earlier with reference to FIG. 3. A first set of control parameters (e.g., operation parameters) of the movable object 102 is generated based on the first set of operation data. The operation parameters include adjustments of an orientation, a position, an attitude, and/or one or more movement characteristics of the movable object 102, the carrier 108, and/or the payload 110. In some embodiments, the operation parameters include instructions for changing a control parameter of imaging device 216 and/or one or more sensors of the movable object sensing system 122, e.g., changing zoom, focus, or other characteristics associated with the imaging device 216.

The movable object 102 flies to the second location 716 and captures the image 702 including the machine readable code 704. The machine readable code 704 is encoded with a second set of operation data for controlling the movable object 102. For example, the second set of operation data includes navigation data, such as a longitude and a latitude, of a tourist attraction spot 706. In some embodiments, one or more data items in the second set of operation data (e.g., encoded in the machine readable code 704) have higher resolutions than one or more data items in the first set of operation data (e.g., obtained at the first location 714). In some embodiments, the first set of operation data corresponds to a first destination or a first waypoint that is different from a second destination or a second waypoint associated with the second set of operation data.

In some examples, the first set of operation data includes location information for a waypoint at the location 716. The movable object 102 flies along the path 712 to arrive at the location 716 based on the first set of operation data. At the location 716, the movable object captures the image 702. For example, the movable object captures the image 702 using the imaging device 216. The movable object 102 processes the image 702 to retrieve the second set of operation data from the machine readable code 704. The movable object 102 adjusts one or more operation parameters (e.g., position and speed of the movable object 102) based on the second set of operation data (e.g., longitude and latitude of the tourist attraction 706). The movable object 102 then flies towards the tourist attraction 706 along a path 718. The path 718 may be based on a manual operation, a semi-manual operation, or an auto-pilot operation of the movable object 102.

In some examples, after the movable object 102 captures the image 702 at the location 716, the movable object 102 can download the image 702 via a downlink communication channel to an electronic device 720. Alternatively, the movable object 102 can process the image 702 to retrieve the machine readable code 704 and transmit the machine readable code 704 via the downlink to the electronic device 720. The electronic device 720 may be the control unit 108 or a mobile device paired with the control unit 108. The electronic device 720 can share the image 702 with one or more other electronic devices (not shown) associated with controlling another movable object (not shown) to fly to the tourist attract 706.

Figure 8:
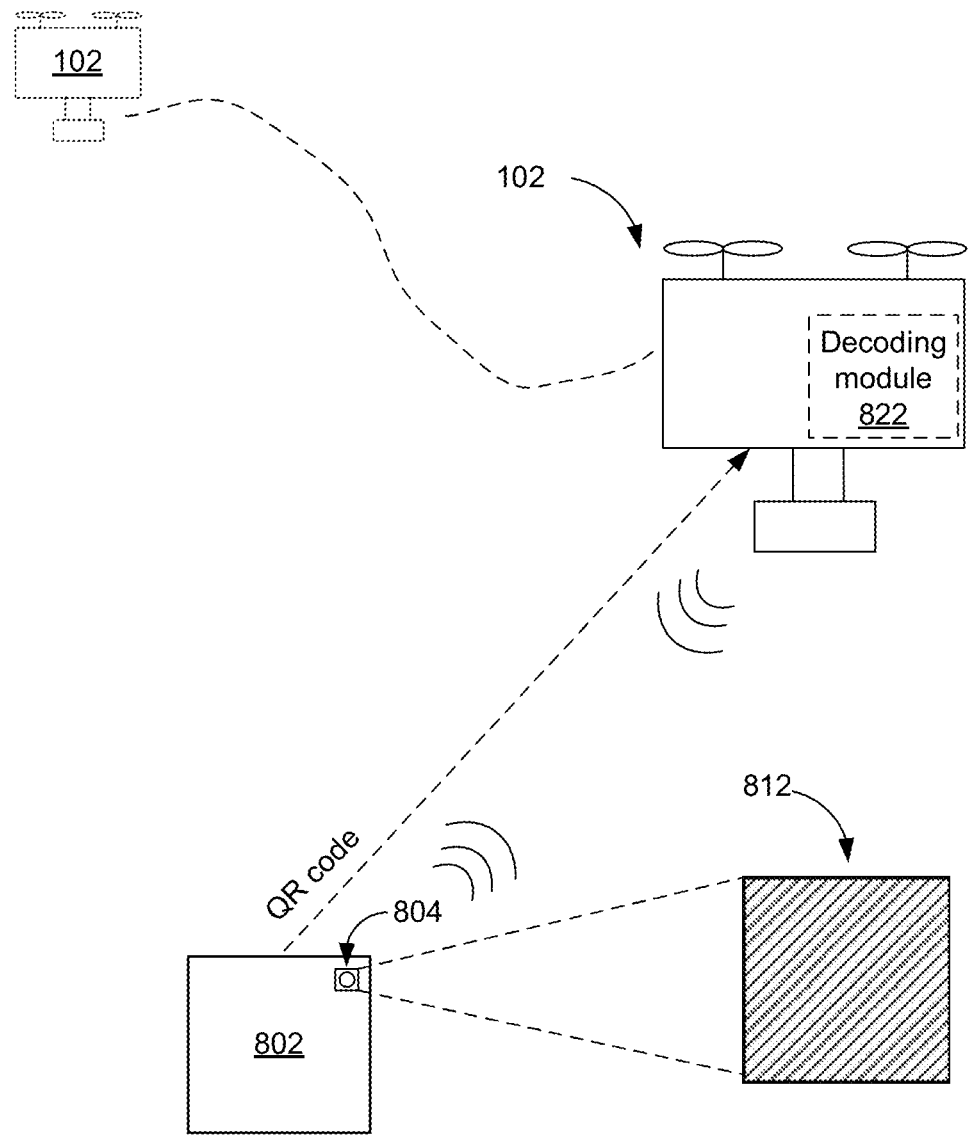
FIG. 8 illustrates an exemplary process of controlling a movable object using a machine readable code, in accordance with some embodiments.

FIG. 8 illustrates an exemplary process of controlling the movable object 102 using a machine readable code, in accordance with some embodiments. In some embodiments, an electronic device 802 is in communication with the movable object 102. The electronic device 802 includes an imaging device 804. In some embodiments, the electronic device 802 is the control unit 108 or a mobile device paired with the control unit 108. The electronic device 802 obtains a machine readable code 812 (represented by box 812 in FIG. 8) or an image including the machine readable code 812. The machine readable code 812 is encoded with a set of operation data for controlling the movable object 102. In some embodiments, the electronic device 802 captures the image including machine readable code 812 using the imaging device 804. In some examples, the image including the machine readable code 812 is displayed on a billboard, a tourist attraction sign. In other examples, the image is projected on an object by a projector. In some embodiments, the electronic device 802 obtains the machine readable code 812 or the image including the machine readable code from a website or from a friend's sharing. In some embodiments, the electronic device 802 generates the machine readable code 812 based on the operation data. For example, the electronic device 802 receives the operation data based on a user input and/or a user interaction with the electronic device 802 as discussed with reference to FIGS. 4A-4B. The electronic device 802 can also retrieve the operation data or download the operation data from a website or from a friend's sharing.

In some embodiments, the electronic device 802 transmits the machine readable code 812 or the image including the machine readable code 812 via an uplink communication channel to the movable object 102. The movable object 102 includes a decoding module 822 for decoding the machine readable code 812 to retrieve the operation data. The movable object 102 then adjusts the operation parameters in accordance with the operation data.

Figure 9:
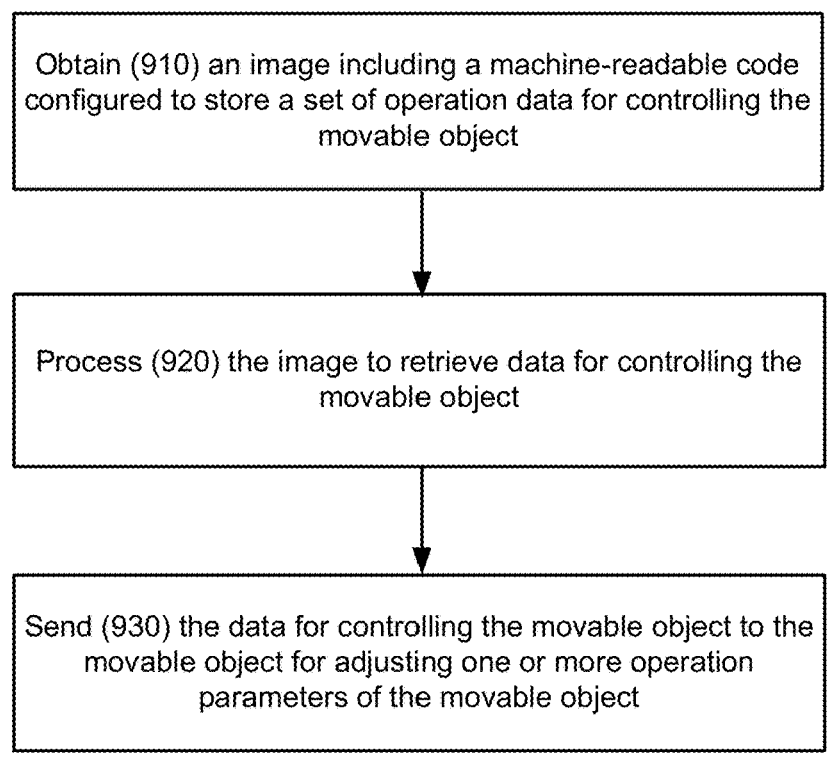
FIG. 9 is a diagram illustrating a method for controlling a movable object, in accordance with some embodiments.

FIG. 9 is a diagram illustrating a method 900 for controlling the movable object 102, in accordance with some embodiments. The method 900 is performed by an electronic device (e.g., electronic device 1002 in FIG. 10, or electronic device 1102 in FIG. 11), such as the control unit 108 (FIG. 1), the computing device 110 (FIG. 1), or a mobile device paired with the control unit 108 for controlling the movable object 102. In some embodiments, the method 900 is performed by the movable object 102 (FIGS. 1-2). Operations performed in FIG. 9 correspond to instructions stored in computer memories or other computer-readable storage mediums of the device or the system.

Figure 10:
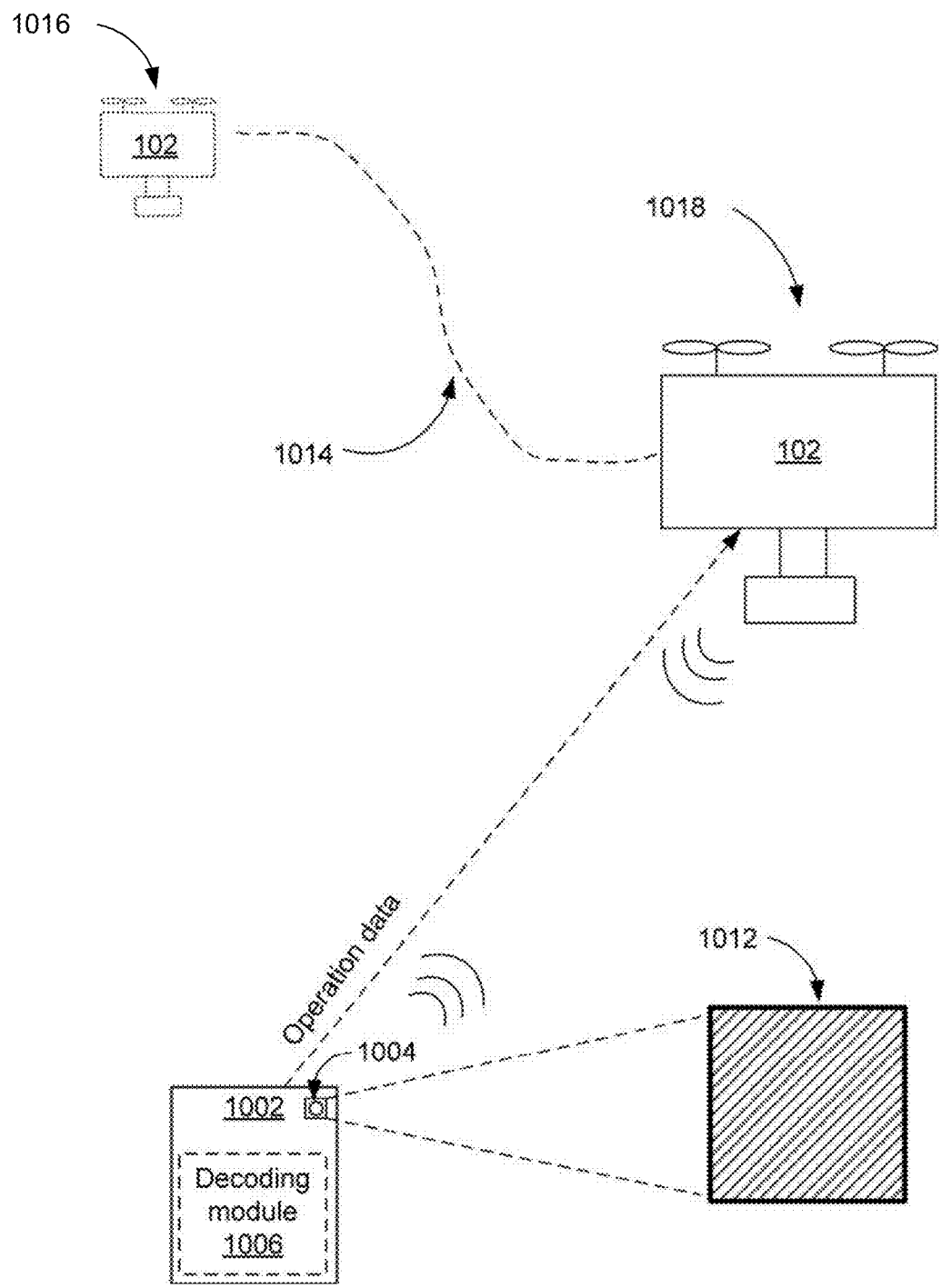
FIG. 10 illustrates an exemplary process of controlling a movable object using a machine readable code, in accordance with some embodiments.

In some embodiments, the electronic device obtains (910) an image including a machine readable code. FIG. 10 illustrates an exemplary process of controlling the movable object 102 using a machine readable code 1012 (represented by box 1012 in FIG. 10), in accordance with some embodiments. The machine readable code 1012 is encoded to store a set of operation data for controlling the movable object 102. The operation data includes navigation data, position control data, gimbal control data, and/or imaging device parameters as discussed earlier with reference to FIG. 3.

In some embodiments, the electronic device 1002 includes an imaging device 1004 for capturing the image including the machine readable code 1012. In some embodiments, the electronic device 1002 receives the image or the machine readable code 1012 from a friend's sharing or from a website. In some embodiments, the electronic device 1002 generates the machine readable code using the operation data. The operation data may be retrieved from a website, shared by a friend, or captured by the imaging device of the electronic device from an image including the operation data. The operation data may also be received from a user input or a user interaction with the electronic device (e.g., FIGS. 4A-4B). In some embodiments, the image including the machine readable code 1012 is projected by a projector onto an object, such as the ground or a billboard. In some examples, the image including the machine readable code 1012 is displayed on a billboard or a tourist attraction sign.

In some embodiments, the electronic device 1002 processes (920) the image to retrieve data for controlling the movable object 102. In some embodiments, the electronic device 1002 processes the image to retrieve the machine readable code 1012. The electronic device 1002 includes a decoding module 1006 for converting or decoding the machine readable code 1012 to retrieve the operation data for controlling the movable object 102. The electronic device 1002 then sends (930) the operation data to the movable object 102 via an uplink communication channel for adjusting one or more operation parameters of the movable object 102. In some embodiments, the electronic device 1002 processes the image to retrieve the machine readable code 1012. The electronic device 1002 sends (930) the machine readable code 1012 to the movable object 102 via the uplink. The movable object 102 decodes the machine readable code 1012 to retrieve the operation data (e.g., FIG. 8).

In some embodiments, the movable object 102 flies from a first location 1016 via a path 1014 to a second location 1018. At the first location 1016, a first set of operation data is used for controlling the movable object 102. At the second location 1018, a second set of operation data is received from the electronic device 1002. The second set of operation data is retrieved from the machine readable code 1012 which is decoded by the electronic device 1002. In some embodiments, one or more data items of the second set of operation data have higher resolutions than one or more data items of the first set of operation data. In some embodiments, first set of operation data and the second set of operation data correspond to distinct destinations.

In some embodiments, after the electronic device 1002 decodes the machine readable code 1012, the electronic device 1002 further edits the set of operation data. The electronic device 1002 then transmits the edited operation data to the movable object 102 via the uplink communication channel.

Figure 11:
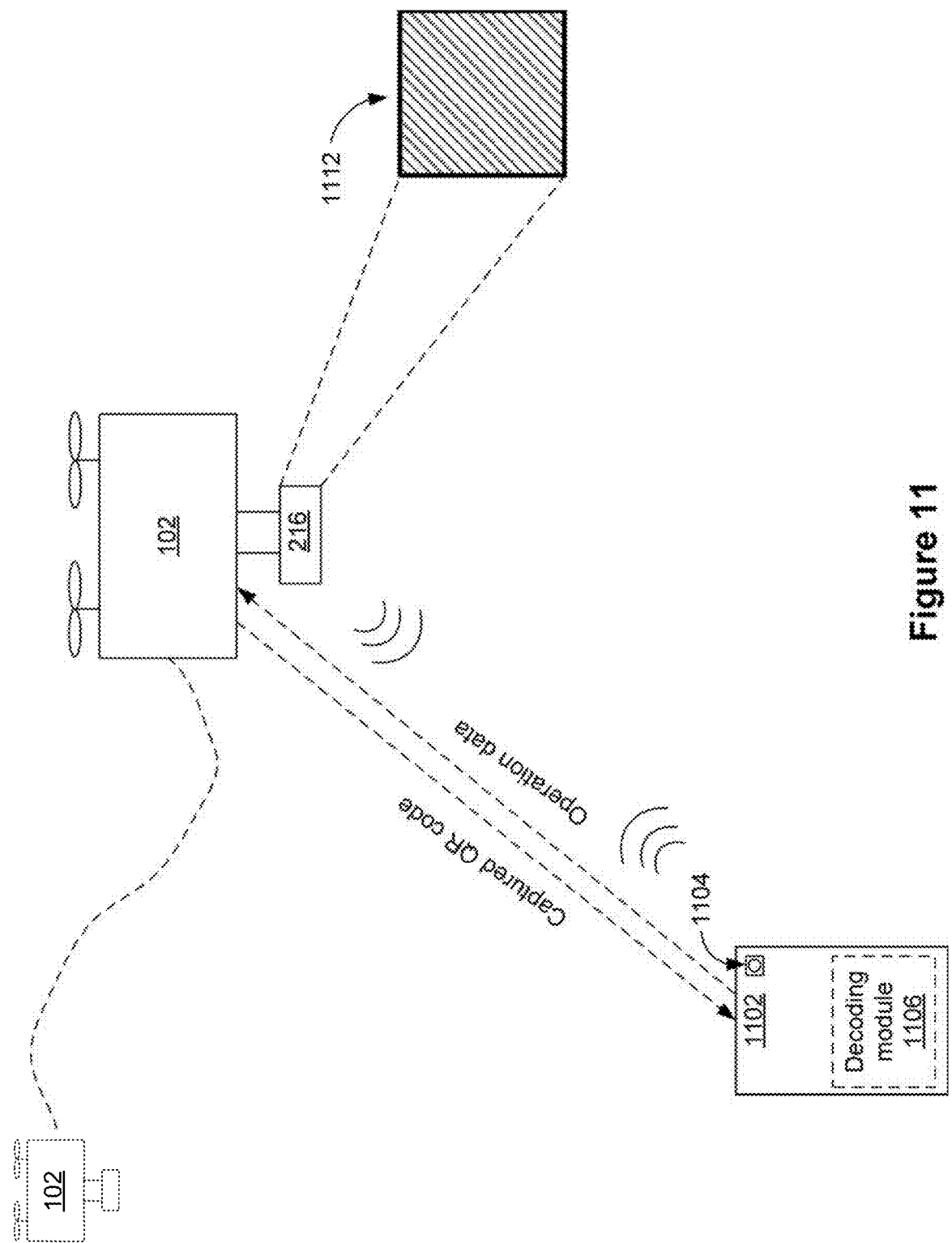
FIG. 11 illustrates an exemplary process of controlling a movable object using a machine readable code, in accordance with some embodiments.

FIG. 11 illustrates an exemplary process of controlling the movable object 102 using a machine readable code 1112 (represented by box 1112 in FIG. 11), in accordance with some embodiments. In some embodiments, the movable object 102 captures an image including the machine readable code 1112 using the imaging device 216. In some embodiments, the image including the machine readable code 1112 is displayed on a sign (e.g., for a tourist attraction spot, FIG. 5), on a billboard (e.g., an advertisement billboard), or is projected by a projector to an object (e.g., the ground). The movable object 102 transmits the image or the machine readable code 1112 to an electronic device 1102 via a downlink communication channel. The electronic device 1102 may be the control unit 108 (FIG. 1), the computing device 110 (FIG. 1), or a mobile device paired with the control unit 108 for controlling the movable object 102. The electronic device 1102 includes a decoding module 1106 for decoding the machine readable code 1112 to retrieve the operation data. The electronic device 1102 then sends the operation data decoded from the machine readable code 1112 to the movable object 102 via the uplink communication channel. The movable object 102 receives the operation data and adjusts one or more operation parameters for controlling the movable object 102.

Figure 12:
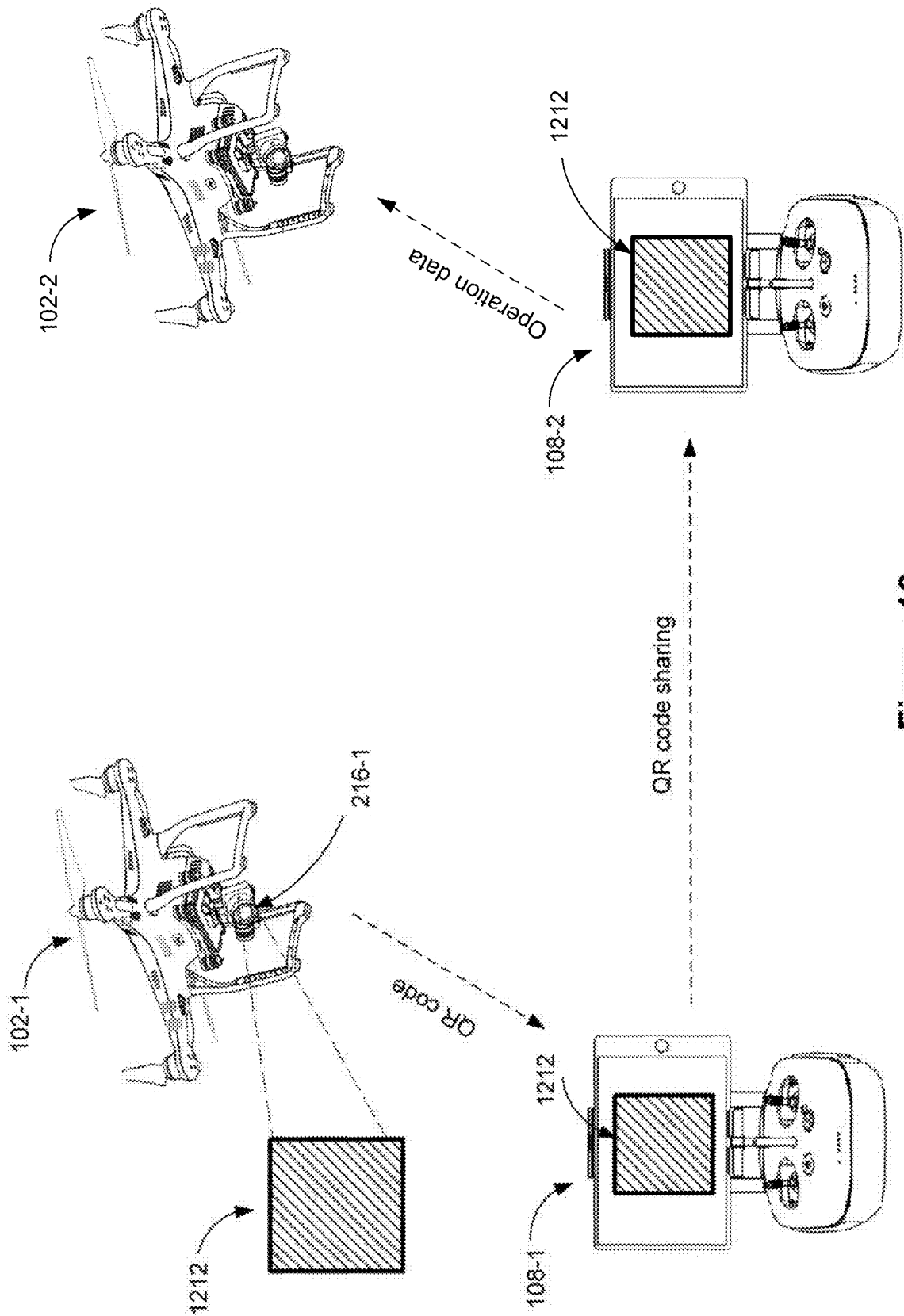
FIG. 12 illustrates an exemplary process of sharing a machine readable code for controlling a movable object, in accordance with some embodiments.

FIG. 12 illustrates an exemplary process of sharing a machine readable code 1212 (represented by box 1212 in FIG. 12) for controlling the movable object(s) 102 (e.g., movable objects 102-1 and 102-2), in accordance with some embodiments. The process illustrated in FIG. 12 can be used for sharing, among two or more movable objects, a navigation path and/or one or more point of interests. In some embodiments, the machine readable code 1212 is encoded to store a set of operation data for controlling the movable object(s) 102. The operation data includes navigation data, position control data, gimbal control data, and/or imaging device parameters as discussed earlier with reference to FIG. 3. In some embodiments, the machine readable code 1212 and/or the operation data encoded by the machine readable code 1212 can be shared between the movable object 102-1 and the movable object 102-2. The movable object 102-1 and the movable object 102-2 are in communication with and are controlled by control unit 108-1 and control unit 108-2 respectively.

In some embodiments, the movable object 102-1 obtains an image including the machine readable code 1212. In some embodiments, the image is displayed on a sign or projected onto an object. The image is captured by the imaging device 216-1 borne by the movable object 102-1. In some other embodiments, the image is received by the movable object 102-1, e.g., by uploading to the movable object 102-1 from a remote control (different from the remote control 108-1) or a mobile device via an uplink communication channel. The movable object 102-1 processes the obtained image to retrieve the machine readable code 1212. In yet some other embodiments, the movable object 102-1 generates the machine readable code 1212 based on operation data of the movable object 102-1, such as one or more waypoints or a destination point. The movable object 102-1 sends the machine readable code 1212 using a downlink communication channel to the control unit 108-1. Alternatively, the movable object 102-1 sends the captured image to the control unit 108-1. The control unit 108-1 processes the image to retrieve the machine readable code 1212.

In some alternative embodiments as illustrated in FIG. 12, without the movable object 102-1 capturing the machine readable code 1212, the control unit 108-1 generates the machine readable code 1212 based on an operation of the movable object 102-1. The operation can be a manual control or an autopilot mode of the movable object 102-1.

In some embodiments, the control unit 108-1 is in communication with the control unit 108-2 via the internet 116 (FIG. 1). The control unit 108-1 sends the machine readable code 1212 to the control unit 108-2. The control unit 108-2 processes the machine readable code 1212 to retrieve the operation data. The control unit 108-2 sends the operation data via an uplink communication channel to the movable object 102-2 for controlling the movable object 102-2 to fly along the same navigation path and/or to visit the same points of interests as the movable object 102-1 does.

In some alternative embodiments, the machine readable code 1212 is shared between the control unit 108-1 and the control unit 108-2 directly or indirectly (e.g., via one or more other computing devices which are configured to relay the shared content between the control unit 108-1 and the control unit 108-2). In some embodiments, alternative to or in combination with sharing the machine readable code 1212, the control unit 108-1 processes the machine readable code 1212 to retrieve the operation data. The control unit 108-1 shares the operation data with the control unit 108-2 for controlling the movable object 102-2.

Figure 13:
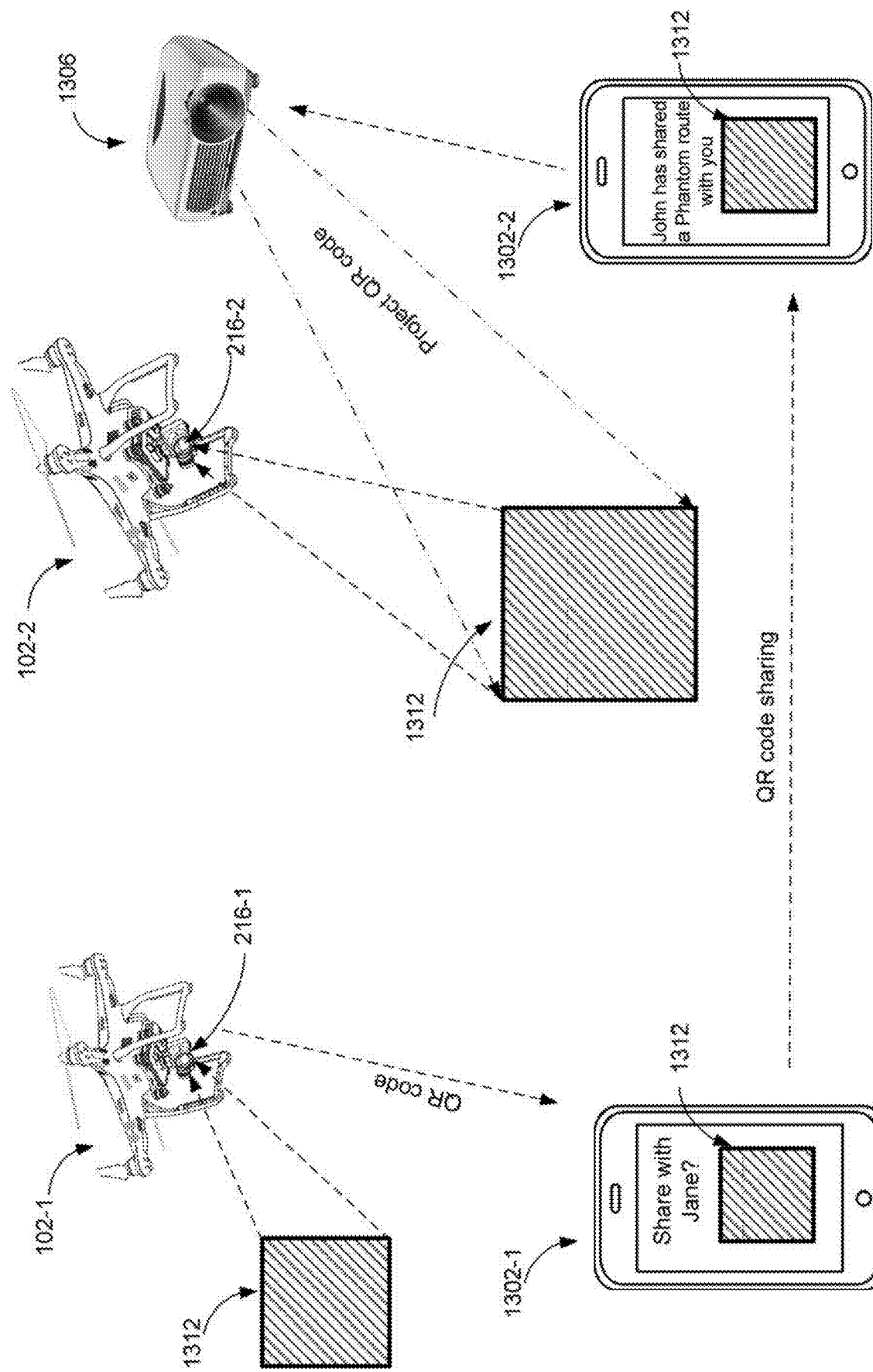
FIG. 13 illustrates an exemplary process of sharing a machine readable code for controlling a movable object, in accordance with some embodiments.

FIG. 13 illustrates an exemplary process of sharing a machine readable code 1312 (represented by box 1312 in FIG. 13) for controlling the movable object(s) 102 (e.g., movable objects 102-1 and 102-2), in accordance with some embodiments. In some embodiments, the machine readable code 1312 is encoded to store a set of operation data for controlling the movable object(s) 102. The operation data includes navigation data, position control data, gimbal control data, and/or imaging device parameters as discussed earlier with reference to FIG. 3. In some embodiments, the machine readable code 1312 and/or the operation data encoded by the machine readable code 1312 can be shared between the movable object 102-1 and the movable object 102-2 for sharing a navigation path and/or one or more waypoints. The movable object 102-1 is in communication with and is controlled by a mobile device 1302-1 paired with a control unit (not shown) for operating the movable object 102-1. The movable object 102-2 is in communication with and is controlled by a mobile device 1302-2 paired with a control unit (not shown) for operating the movable object 102-2.

In some embodiments, the movable object 102-1 obtains an image including the machine readable code 1312. The image can be captured by the imaging device 216-1. The image can be received by the movable object 102-1 via any suitable communication channel. Alternatively, the image can be generated by the movable object 102-1 using operation data of the movable object 102-1. The movable object 102-1 processes the image to retrieve the machine readable code 1312 and sends the machine readable code 1312 using a downlink communication channel to the mobile device 1302-1. A user (e.g., John) of the mobile device 1302-1 shares the machine readable code 1312 using an application running on the mobile device 1302-1 with a contact (e.g., Jane). The application can be a social networking application or a movable object control application. The mobile device 1302-1 is in communication with the mobile device 1302-2 of Jane's via the Internet 116 (FIG. 1). The machine readable code 1312 is displayed on the mobile device 1302-2. The machine readable code 1312 can be shared between the mobile device 1302-1 and the mobile device 1302-2 directly or indirectly (e.g., via one or more other computing devices which are configured to relay the shared content between the mobile device 1302-1 and the mobile device 1302-2). In some embodiments, alternative to or in combination with sharing the machine readable code 1312, the mobile device 1302-1 processes the machine readable code 1312 to retrieve the operation data. The mobile device 1302-1 shares the operation data with the mobile device 1302-2 using the application as disclosed above.

As shown in FIG. 13, the mobile device 1302-2 sends an image including the machine readable code 1312 to a projector 1306. The projector 1306 projects the image onto an object (not shown), such as the ground, a wall, or a billboard, which is visible to the imaging device 216-2 of the movable object 102-2. The imaging device 216-2 captures the projected image including the machine readable code 1312. The movable object 102-2 processes the captured image to retrieve the operation data encoded within the machine readable code 1312. The movable object 102-2 adjusts one or more operation parameters in accordance with the operation data, to follow the same navigation path or to fly to the same waypoints as shared by the movable object 102-1.

Many features of the embodiments consistent with the present disclosure can be performed in, using, or with the assistance of hardware, software, firmware, or combinations thereof. Consequently, features of the embodiments consistent with the present disclosure may be implemented using a processing system. Exemplary processing systems (e.g., processor(s) 202) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the embodiments consistent with the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the embodiments consistent with the present disclosure can be incorporated in software and/or firmware for controlling the hardware of a processing system, and for enabling a processing system to interact with other mechanism utilizing the results of the embodiments. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of consistent with the present disclosure have been described above, it should be understood that they have been presented by way of example, and not limitation. It will be apparent to persons skilled in the relevant art that various changes in form and detail can be made therein without departing from the spirit and scope of the invention.

Embodiments consistent with the present disclosure have been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the embodiments consistent with the present disclosure has been provided for the purposes of illustration and description. It is not intended to be exhaustive or to limit the invention to the precise forms disclosed. The breadth and scope of the embodiments consistent with the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for controlling a movable object, comprising:
   at the movable object having one or more processors and memory storing instructions for execution by the one or more processors:
      obtaining an image including a machine-readable code configured to store a set of operation data for controlling the movable object, the set of operation data including data in one or more data fields, wherein the set of operation data includes navigation data including one or more data items selected from the group consisting of one or more waypoints, a longitude, a latitude, an altitude, one or more waypoints of a path, and one or more points of interest;
      processing the image to retrieve the machine-readable code and the set of operation data;
      assessing a validity of the set of operation data;
      validating the set of operation data in response to determining that data in each of the one or more data fields has a valid format and is within a valid range; and
      adjusting, in response to the set of operation data having been validated, one or more operation parameters of the movable object based on the set of operation data to control an operation of the UAV.

2. The method of claim 1, wherein obtaining the image comprises capturing the image using an imaging device of the movable object.

3. The method of claim 2, wherein the image is displayed on an object.

4. The method of claim 2, wherein the image is projected by a projector onto an object.

5. The method of claim 1, wherein obtaining the image comprises receiving the image from a computing device in communication with the movable object.

6. The method of claim 5, wherein the image is captured by an imaging device associated with the computing device.

7. A system for controlling a movable object, the system comprising:
   an imaging device comprising an image sensor and an optical device;
   one or more processors coupled to the imaging device;
   memory; and
   one or more programs, wherein the one or more programs are stored in the memory and configured to be executed by the one or more processors, the one or more programs including instructions for:
      obtaining an image including a machine-readable code configured to store a set of operation data for controlling the movable object, the set of operation data including data in one or more data fields, wherein the set of operation data includes navigation data including one or more data items selected from the group consisting of one or more waypoints, a longitude, a latitude, an altitude, one or more waypoints of a path, and one or more points of interest;

processing the image to retrieve the machine-readable code and the set of operation data;

assessing a validity of the set of operation data;

validating the set of operation data in response to determining that data in each of the one or more data fields has a valid format and is within a valid range; and adjusting, in response to the set of operation data having been validated, one or more operation parameters of the movable object based on the set of operation data to control an operation of the UAV.

8. The system of claim 7, wherein obtaining the image comprises receiving the image from a computing device in communication with the movable object and the image is received by a first user of the computing device from a second user.

9. The system of claim 7, wherein obtaining the image comprises receiving the image from a computing device in communication with the movable object and the machine-readable code is generated by the computing device based on user interactions received at the computing device, and wherein the user interactions indicate one or more items selected from the group consisting of a destination position, a change to the navigation data, a change to a control parameter of the movable object, a change to a gimbal parameter, and a change to an imaging device parameter.

10. The system of claim 7, wherein the one or more operation parameters of the movable object are generated based on an initial set of operation data for controlling the movable object, and wherein one or more data items in the set of operation data from the machine-readable code have higher resolutions than one or more data items in the initial set of operation data.

11. The system of claim 7, wherein the one or more operation parameters are generated based on an initial set of navigation data for navigating the movable object, and wherein the initial set of navigation data and the set of operation data in the machine-readable code correspond to distinct locations.

12. An unmanned aerial vehicle (UAV), comprising:
a propulsion system;
one or more sensors;
an imaging device comprising an image sensor and an optical device; and
one or more processors coupled to the propulsion system, the one or more sensors, and the imaging device, the one or more processors configured for:
obtaining an image including a machine-readable code configured to store a set of operation data for controlling the movable object, the set of operation data including data in one or more data fields, wherein the set of operation data includes navigation data including one or more data items selected from the group consisting of one or more waypoints, a longitude, a latitude, an altitude, one or more waypoints of a path, and one or more points of interest;

processing the image to retrieve the machine-readable code and the set of operation data;

assessing a validity of the set of operation data;

validating the set of operation data in response to determining that data in each of the one or more data fields has a valid format and is within a valid range; and adjusting, in response to the set of operation data having been validated, one or more operation parameters of the movable object based on the set of operation data to control an operation of the UAV.

13. The UAV of claim 12, wherein obtaining the image comprises receiving the image from a computing device in communication with the movable object.

14. The UAV of claim 13, wherein obtaining the image comprises capturing the image using an imaging device of the movable object and the image is captured by an imaging device associated with the computing device.

15. The UAV of claim 13, wherein the image is received by a first user of the computing device from a second user.

16. The UAV of claim 13, wherein the machine-readable code is generated by the computing device based on user interactions received at the computing device, and wherein the user interactions indicate one or more items selected from the group consisting of a destination position, a change to the navigation data, a change to a control parameter of the movable object, a change to a gimbal parameter, and a change to an imaging device parameter.

17. The UAV of claim 12, wherein the one or more operation parameters of the movable object are generated based on an initial set of operation data for controlling the movable object, and wherein one or more data items in the set of operation data from the machine-readable code have higher resolutions than one or more data items in the initial set of operation data.

18. The UAV of claim 12, wherein the one or more operation parameters are generated based on an initial set of navigation data for navigating the movable object, and wherein the initial set of navigation data and the set of operation data in the machine-readable code correspond to distinct locations.

19. The UAV of claim 12, wherein the set of operation data stored in the machine-readable code in the image comprises gimbal control data configured to control an operation of a gimbal of the UAV and camera parameters configured to control an operation of a camera of the UAV.

* * * * *